US008650948B2

(12) United States Patent
Lee et al.

(10) Patent No.: US 8,650,948 B2
(45) Date of Patent: Feb. 18, 2014

(54) AUTOMATIC SEEPAGE METER

(75) Inventors: Bong Joo Lee, Daejeon (KR); Kyung Seok Ko, Daejeon (KR)

(73) Assignee: Korea Institute of Geoscience and Mineral Resources, Daejeon (KR)

(*) Notice: Subject to any disclaimer, the term of this patent is extended or adjusted under 35 U.S.C. 154(b) by 274 days.

(21) Appl. No.: 13/291,569

(22) Filed: Nov. 8, 2011

(65) Prior Publication Data
US 2013/0014570 A1    Jan. 17, 2013

(30) Foreign Application Priority Data
Jul. 12, 2011 (KR) .................. 10-2011-0069086

(51) Int. Cl.
G01F 1/34 (2006.01)
G01F 1/37 (2006.01)

(52) U.S. Cl.
USPC .............. 73/219; 73/861; 73/861.42; 702/45; 702/50

(58) Field of Classification Search
USPC ............ 73/219, 861, 861.05, 861.07, 861.42; 702/45, 50
See application file for complete search history.

(56) References Cited

U.S. PATENT DOCUMENTS

| 4,727,936 | A | * | 3/1988 | Mioduszewski et al. ....... 166/53 |
| RE33,102 | E | * | 10/1989 | Visser et al. .................. 166/267 |
| 4,969,111 | A | * | 11/1990 | Merva .............................. 702/13 |
| 5,341,877 | A | * | 8/1994 | Abdul et al. ............... 166/272.1 |
| 5,373,727 | A | * | 12/1994 | Heller et al. ...................... 73/38 |
| 5,497,663 | A | | 3/1996 | Reay et al. |
| 6,491,828 | B1 | * | 12/2002 | Sivavec et al. ................ 210/739 |
| 6,874,371 | B1 | | 4/2005 | Smith et al. |
| 6,993,437 | B1 | | 1/2006 | Chadwick et al. |
| 2007/0187088 | A1 | * | 8/2007 | Ahn ............................ 166/242.5 |
| 2008/0196509 | A1 | * | 8/2008 | Charette .................... 73/861.07 |
| 2009/0139309 | A1 | * | 6/2009 | Chavdar et al. ................... 73/38 |
| 2009/0241685 | A1 | * | 10/2009 | Charette .................... 73/861.07 |
| 2010/0198547 | A1 | * | 8/2010 | Mulligan et al. .............. 702/100 |
| 2011/0198125 | A1 | | 8/2011 | Krahn |

FOREIGN PATENT DOCUMENTS

DE             260339 A1 *   9/1988

OTHER PUBLICATIONS

Brodie et al., "Seepage meter: progressing a simple method of directly measuring water flow between surface water and groundwater systems", Australian Journal Of Earth Sciences, Feb. 2009; 56 (1): pp. 3-11.*
Rosenberry D., "A seepage meter designed for use in flowing water", Journal Of Hydrology, Sep. 15, 2008; 359 (1/2), pp. 118-130.*
Taniguchi et al., "Submarine groundwater discharge measured by seepage meters in sicilian coastal waters", Continental Shelf Research, Feb. 7, 2006; pp. 835-842.*
Taniguchi et al., "Continuous measurements of ground-water seepage using an automatic seepage meter", Ground Water Jul.-Aug. 1993, vol. 31, No. 4), pp. 675-679.*

* cited by examiner

Primary Examiner — David A Rogers
(74) Attorney, Agent, or Firm — Rabin & Berdo, P.C.

(57) ABSTRACT

The present invention relates to an automatic seepage meter for measuring groundwater-surface water exchange in a mixed zone of stream. The present invention includes: the chamber installed in streambed sediment; the device for measuring amount of groundwater recharge through a change in water level accompanied by discharging water in the water in case of losing stream; and the device for measuring amount of groundwater discharge through a change in water level according to an increased water from the chamber to the water bath for measuring discharge in case of gaining stream.

6 Claims, 7 Drawing Sheets (A) Losing stream (B) Gaining stream

In case of Gaining stream

AUTOMATIC SEEPAGE METER

CROSS-REFERENCE TO RELATED PATENT APPLICATION

This application claims the benefit of and priority to Korean Patent Application No. 10-2011-0069086, filed on Jul. 12, 2011, in the Korean Intellectual Property Office, the disclosure of which is incorporated herein in its entirety by reference.

BACKGROUND OF THE INVENTION

1. Field of the Invention

The present invention relates to an automatic seepage meter for measuring groundwater-surface water exchange in a mixed zone of stream.

2. Description of the Related Art

Seepage meters are instruments for measuring the flow of water between groundwater and a surface water body such as a lake, wetland, estuary, or stream. Such seepage meters were used in the 1940s and 1950s to measure water loss in irrigation canals (Israelson and Reeve, 1944; Warnick, 1951; Robinson and Rhower, 1952), and Lee (1977) devised and used a seepage meter of half-barrel shape to evaluate an interaction between groundwater and surface water.

The seepage meter initially proposed by Lee (1977), as illustrated in FIG. 1, includes a drum 100 which one side is closed. The drum 100 is buried into streambed sediment and connected to a collection bag 103 by a hose to measure seepage flux (discharge of groundwater to surface water or recharge of groundwater by surface water). That is, after filling the collection bag 103 by a certain amount of water before measuring seepage flux and elapsing a certain time, an increased or decreased amount of water in the collection bag 103 is measured. An amount of water in the collection bag 103 is increased in a gaining stream where groundwater discharges into stream, and decreased in a losing stream where groundwater is recharged by surface water.

Since the seepage meter proposed by Lee (1977) is a manual measuring type that directly measures an amount of water increased or decreased in the collection bag 103 after elapsing a certain time, it is difficult to obtain information on the temporal evolution of seepage.

SUMMARY OF THE INVENTION

To solve above problem, it is therefore an object of the present invention to sequentially measure changes of seepage flux in a mixed zone of stream by inducing changes in discharge and recharge amounts of groundwater to changes in water levels in two cylindrical water baths respectively.

The other object and advantages of the present invention will be described below and will be understood by exemplary embodiment of the present invention. The object and the advantages of the present invention will be accomplished by means represented in claims and combinations of them.

As means to solve above problem, a first check valve 60 and a second check valve 61 are used to induce changes in discharge and recharge amounts of groundwater through the chamber 10 separately to changes in water levels of independent water bathes. Mariotte siphon principle was used to prevent water flow from a water bath for measuring recharge 21 to the chamber 10 by a difference in hydraulic head between the chamber 10 and the water bath for measuring recharge 21.

If a water bath 200, which one end is formed open with an outflow hole 210 on an outer circumferential surface thereof as shown in FIG. 3A, is used by filling water inside thereof with a certain amount of water, pressure applied to the water bath 200 changes according to a water height in the water bath 200 when the water filled inside the water bath 200 is discharged. Therefore, an amount of discharge water changes.

On the other hand, the present invention applied with a Mariotte siphon is a device devised by inserting a tube 320 for supplying air to a sealed water bath 300 to discharge fluid from the water bath 300 sequentially in constant amount. The Mariotte's bottle as illustrated in FIG. 3B does not bring out a water flow from the water bath 300 to an outflow hole 340 since a pressure of the outflow hole 340 from the water bath 300 side (water pressure P1+air pressure P2) is same as a pressure from the other end side of the outflow hole 340 (atmospheric pressure P0), when a bottom end of the air supplying tube 320 is positioned at a height same as the outflow hole 340. However, if the height of the outflow hole 340 positions lower than the bottom end of the air supplying tube 320 as illustrated in FIG. 3C, a pressure difference P4 as much as a difference in hydraulic head between the bottom end of the air supplying tube 310 and the outflow hole 340 is produced, and the water bath 300 side pressure of the outflow hole 340, which is a sum of water pressure P1+air pressure P2+pressure difference P4, becomes larger than the pressure of the end of the other side of the outflow hole 340 (atmospheric pressure P0) to discharge the water in the water bath 300 through the outflow hole 340. Further, such Mariotte siphon as illustrated in FIG. 3D induces air through the air supplying tube 320 and increases the air pressure P2 in the water bath 300 equivalent to the decreased water pressure P1 with lowered water level even when water inside the water bath 300 is discharged and lowers its water level. Therefore, a constant amount of water is discharged out from the water bath 300 by a pressure as much as P4 identical to FIG. 3C regardless of the water level in the water bath 300 except a case when the water level becomes lower than the bottom end of the air supplying tube 320.

As shown in FIG. 4, a sum of a hydraulic pressure by water depth from a top end of the chamber 10 to a water surface of stream and a pressure by atmospheric pressure is operated in the chamber 10. In the water bath 21, the pressure at the bottom end of the air supplying tube is same as the atmospheric pressure P0. And the pressure between the outflow hole 24 formed on the outer circumferential surface of the water bath 21 and the bottom end of the air supplying tube in the water bath 21 is equivalent to the hydraulic pressure by water depth from a top end of the chamber 10 to a water surface of stream. Therefore, if there is no changes in pressure within chamber 10, water flow from the water bath 21 to the chamber 10 does not bring out.

The present invention designed a water bath for measuring groundwater recharge applied with the Mariotte siphon principle to flow water of a water bath for measuring recharge 21 to the chamber 10 in case of losing stream where groundwater level is lower than surface water level thereby solves the problem of the previously mentioned open type water bath.

BRIEF DESCRIPTION OF REFERENCE NUMBERS OF MAJOR ELEMENTS

Figure 1:
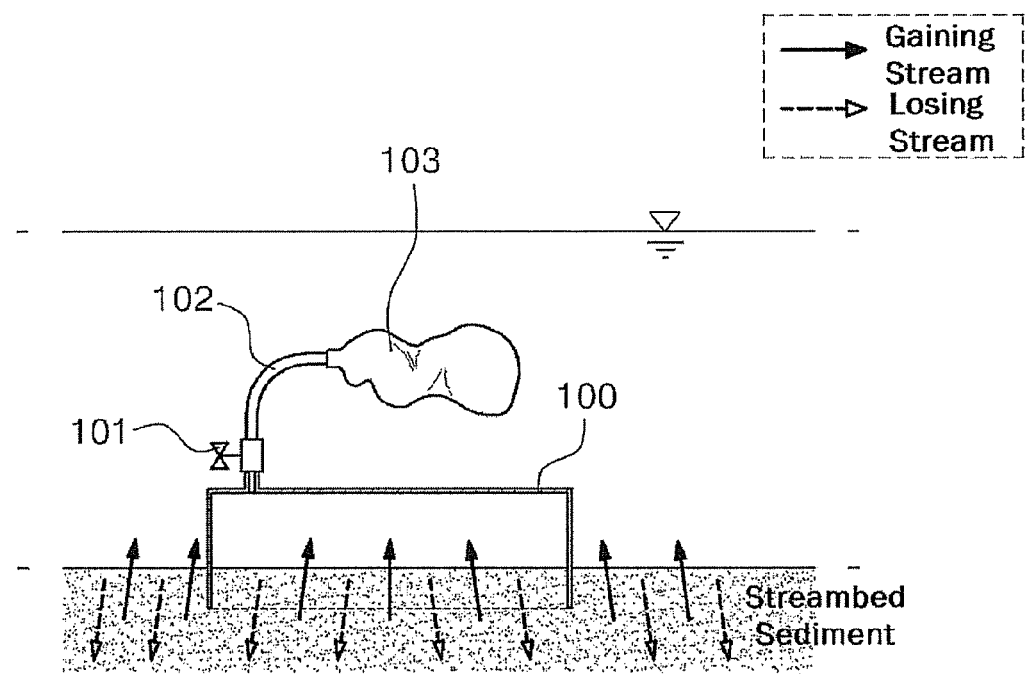
FIG. 1 is a front cross sectional view illustrating a conventional seepage meter.

| | |
|---|---|
| 10: chamber | 11: open pipe |
| 12: connection hole | 13, 25, 35: control valve |
| 20: device for measuring groundwater recharge | |
| 21: water bath for measuring recharge | |
| 22: stopper member | 23, 33: tube |
| 24: outflow hole | 26: measurement marking |
| 27: support | |
| 30: device for measuring groundwater discharge | |
| 31: water bath for measuring discharge | |
| 32: fix unit | |
| 34: inflow hole | 40: outflow pipe |
| 50: inflow pipe | 60: first check valve |
| 61: second check valve | 71: first pressure sensor |
| 72: second pressure sensor | |
| h1: water level drop | h2: water level change |

DETAILED DESCRIPTION OF THE INVENTION

Before describing detailed description of various exemplary embodiments of the present invention, it will be understood that detail construction and arrangements of the constituting elements described in the following description and illustrated drawings shall not restrict their application. The present invention can be realized and embodied by other exemplary embodiments, and can be performed by various methods. It will be further understood that expression and words in the present invention regarding the terms related to directions of devices and elements (for example "front", "back", "up", "down, "top", "bottom", "left", "right", "lateral", etc) are used only to simplify a description of the present invention but are not represented nor meant for the related devices and the elements to be directed simply along a particular direction.

The present invention has following features to accomplish the said object.

The present invention will now be described more fully hereinafter with reference to the accompanying drawings, in which preferred embodiments of the invention are shown. Prior to describing the invention, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Accordingly, the exemplary embodiment described in the specification and the construction illustrated in the drawings is only the most preferable exemplary embodiment and does not represent all the technical ideas of the present invention. However, it should be understood that exemplary embodiments of the invention are to cover all modifications, equivalents, and alternatives falling within the scope of the invention at the time of the present application.

One exemplary embodiment of the present invention is like follows.

A seepage meter for measuring seepage flux in a mixed zone of stream comprises: a chamber 10 drived into streambed sediment; a device for measuring groundwater recharge 20 that is filled with water inside thereof and installed fixed on the bottom surface of stream to measure a water level drop h1 by flowing water inside thereof to the chamber 10 in case of losing stream, wherein the device 20 is connected and communicated with the chamber 10; a device for measuring groundwater discharge 30 that is installed fixed on the bottom surface of stream to measure a water level change h2 by inflowing water from the chamber 10 in case of gaining stream, wherein the device 30 is connected and communicated with the chamber 10; a first pressure sensor 71 installed above an inner water surface of the device for measuring groundwater recharge 20 to measure groundwater recharge through a change in air pressure by the water level drop h1; and a second pressure sensor 72 installed on a bottom surface of the device for measuring groundwater discharge 30 to measure groundwater discharge through a change in the water level change h2.

Further, a lower end of the chamber 10 is open and installed in the bottom sediment of stream and the chamber 10 comprises: a control valve 13 that controls water that flows into and out from the chamber 10; an outflow pipe 40 to discharge water of the device for measuring groundwater recharge 20 to the chamber 10; an inflow pipe 50 to flow water of the chamber 10 into the device for measuring groundwater discharge 30; a first check valve 60 installed in the outflow pipe 40 for water to flow only to the chamber 10; and a second check valve 61 installed in the inflow pipe 50 for surface water of the chamber 10 to flow only to the device for measuring groundwater discharge 30.

Further, the device for measuring groundwater recharge 20 is sealed at both ends thereof and filled with water, and the device for measuring groundwater recharge 20 comprises: a water bath for measuring recharge 21 formed with an outflow hole 24, wherein the outflow hole 24 is formed on an outer circumferential surface of the water bath 21 and positioned at a horizontal line identical with a top surface of the chamber 10; a tube 23 installed in the water bath for measuring recharge and which lower end is positioned at a horizontal line identical with a top surface of stream, wherein the tube 23 inflows air to increase air pressure as much as water pressure decreased from decreased water level; and a control valve 25 positioned at the outflow hole 24 that controls water drain from the water bath 21.

Further, the device for measuring groundwater discharge 30 is sealed at both ends thereof and installed into the streambed sediment by its one end, and the device for measuring groundwater discharge 30 comprises: a water bath for measuring discharge 31 formed with an inflow hole 34, wherein the inflow hole 34 connected to a connection hole 12 of the chamber 10 is formed on an outer circumferential surface of the water bath 31; a tube 33 installed in the water bath 31 to inflow air inside the water bath 31; and a control valve 35 positioned at the inflow hole 34 that controls flowing in and out of surface water.

Further, the chamber 10, the discharge pipe 40, and the inflow pipe 50 are filled with water inside thereof before measuring groundwater recharge or discharge.

Figure 2:
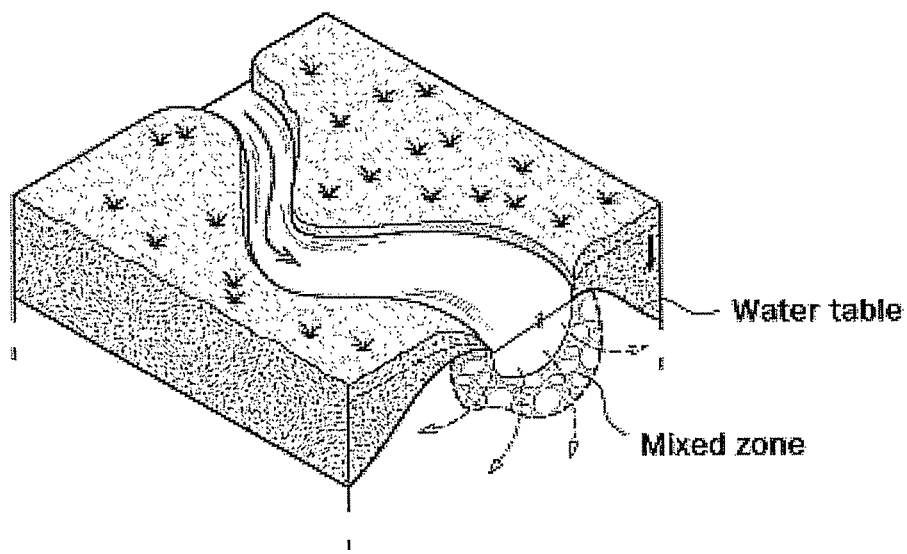
FIG. 2 is a perspective view illustrating a losing stream and a gaining stream applied with a seepage meter capable of sequential measuring of discharge and recharge amounts of groundwater according to one exemplary embodiment of the present invention.
Figure 2:
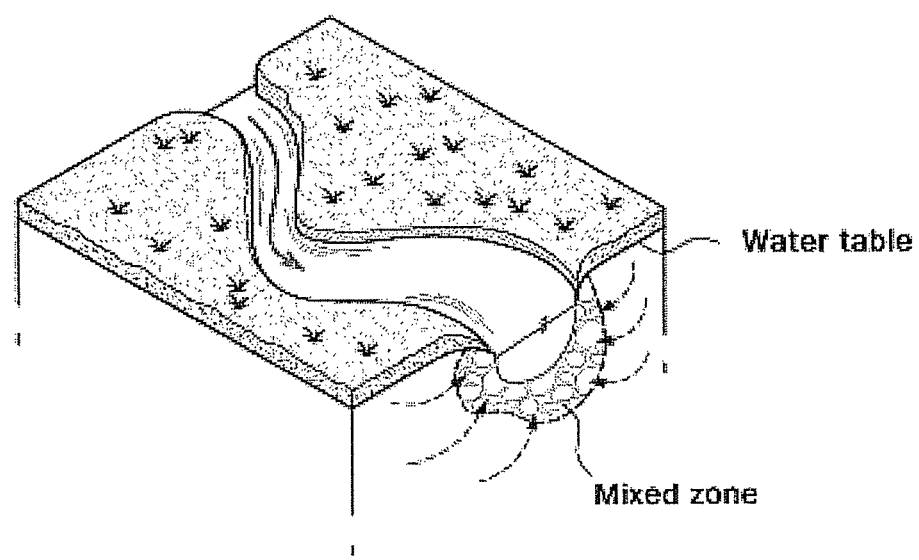
Figure 3:
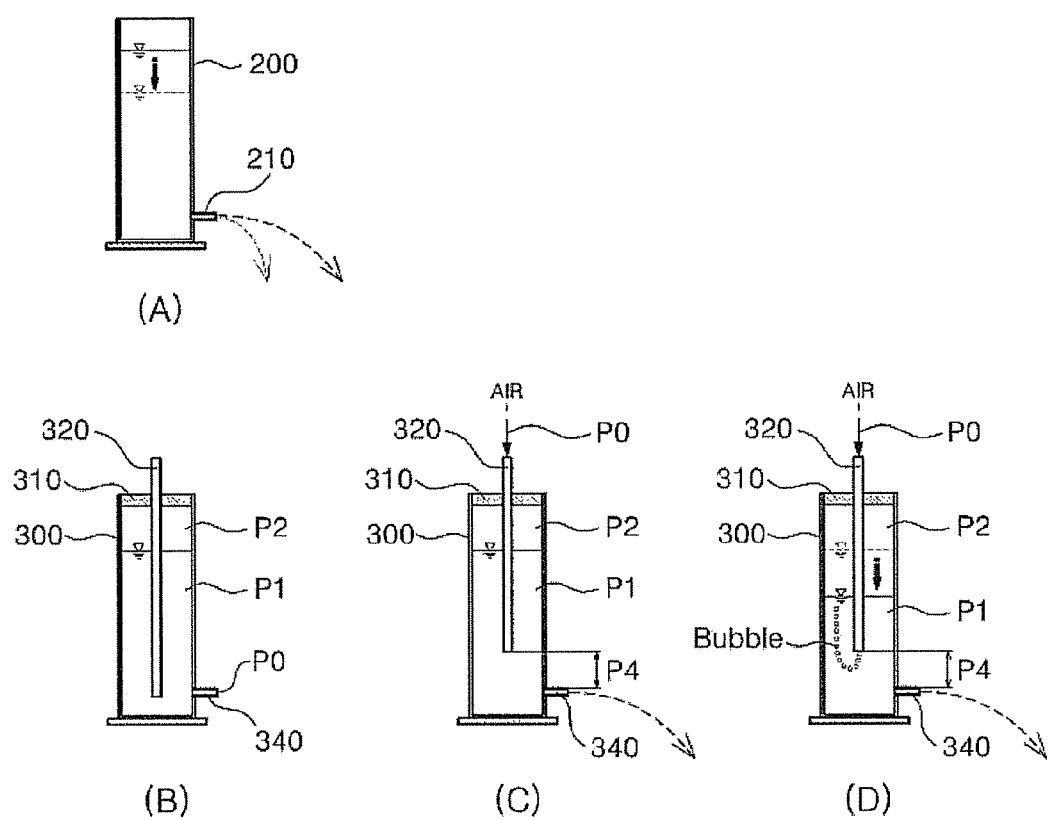
FIG. 3 is a perspective view illustrating a principle of Mariotte's bottle applied to a seepage meter capable of sequential measuring of discharge and recharge amounts of groundwater according to one exemplary embodiment of the present invention.
Figure 4:
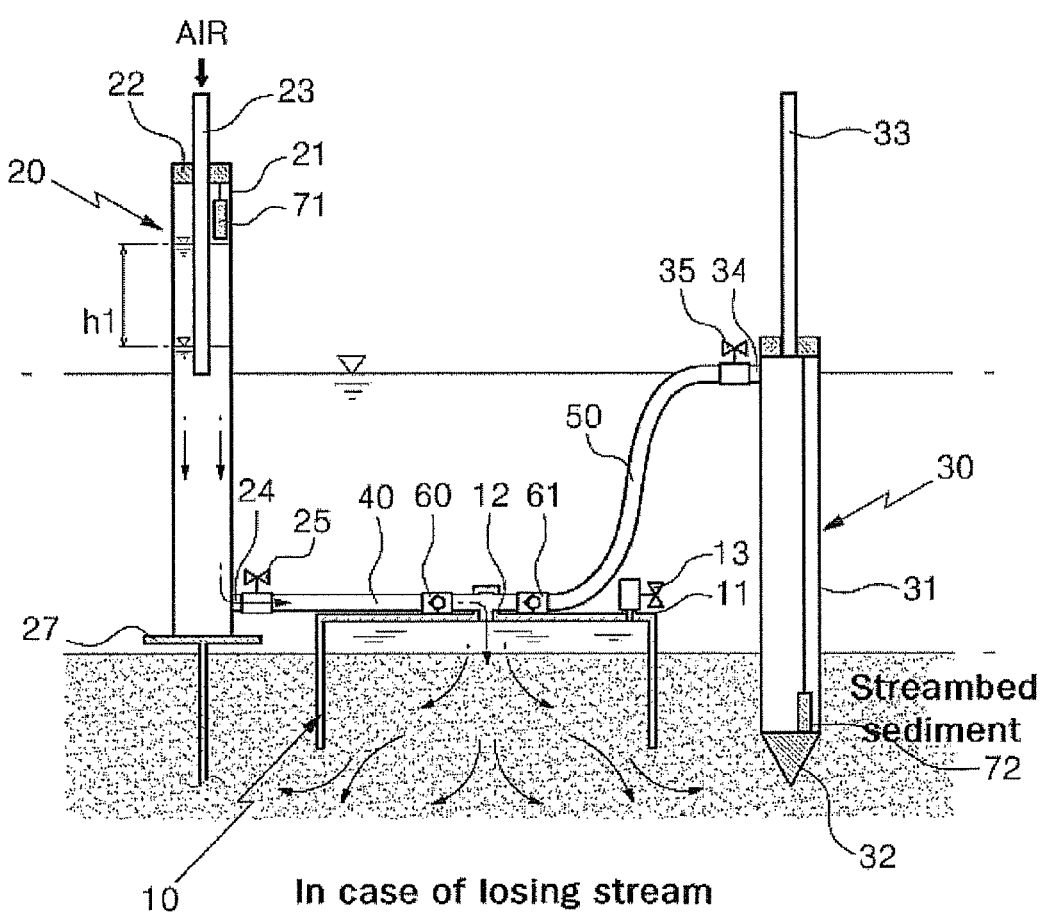
FIG. 4 is a front cross sectional view illustrating a measuring of groundwater recharge by a seepage meter capable of sequential measuring of discharge and recharge amounts of groundwater according to one exemplary embodiment of the present invention.
Figure 5:
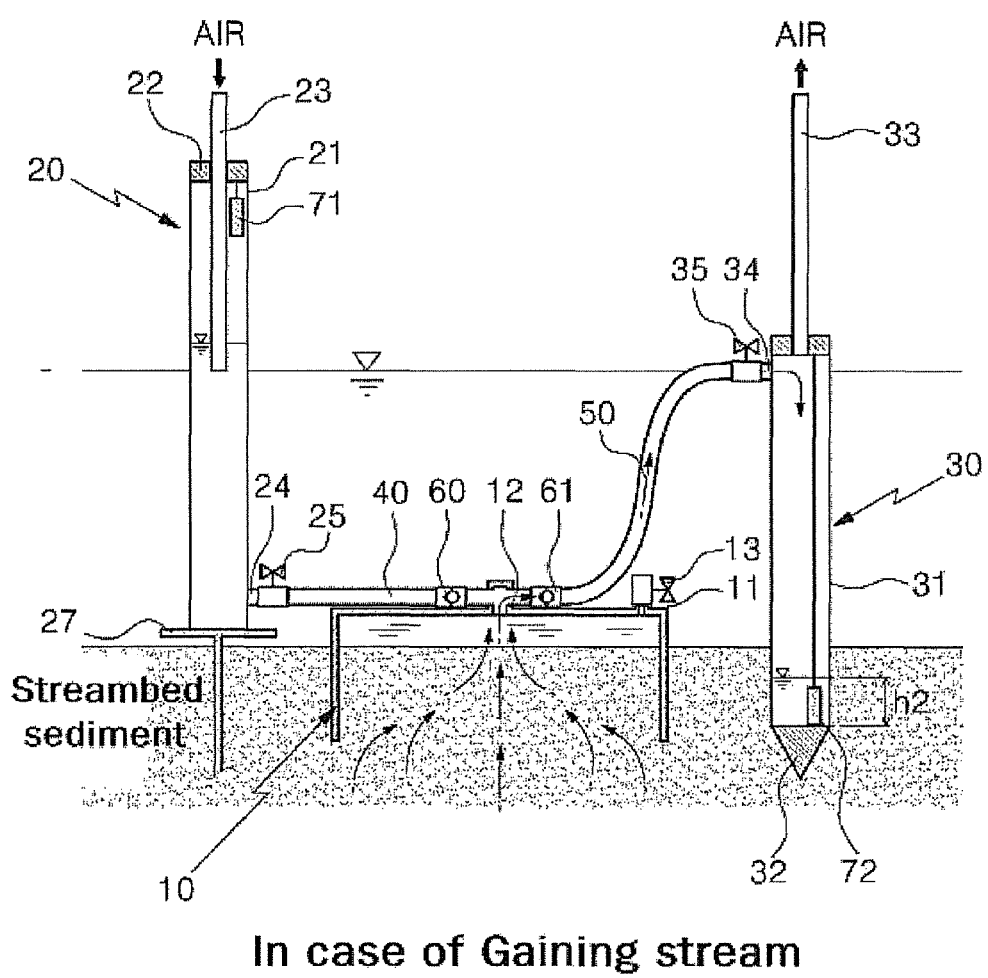
FIG. 5 is a front cross sectional view illustrating a measuring of groundwater discharge by a seepage meter capable of sequential measuring of discharge and recharge amounts of groundwater according to one exemplary embodiment of the present invention.
Figure 6:
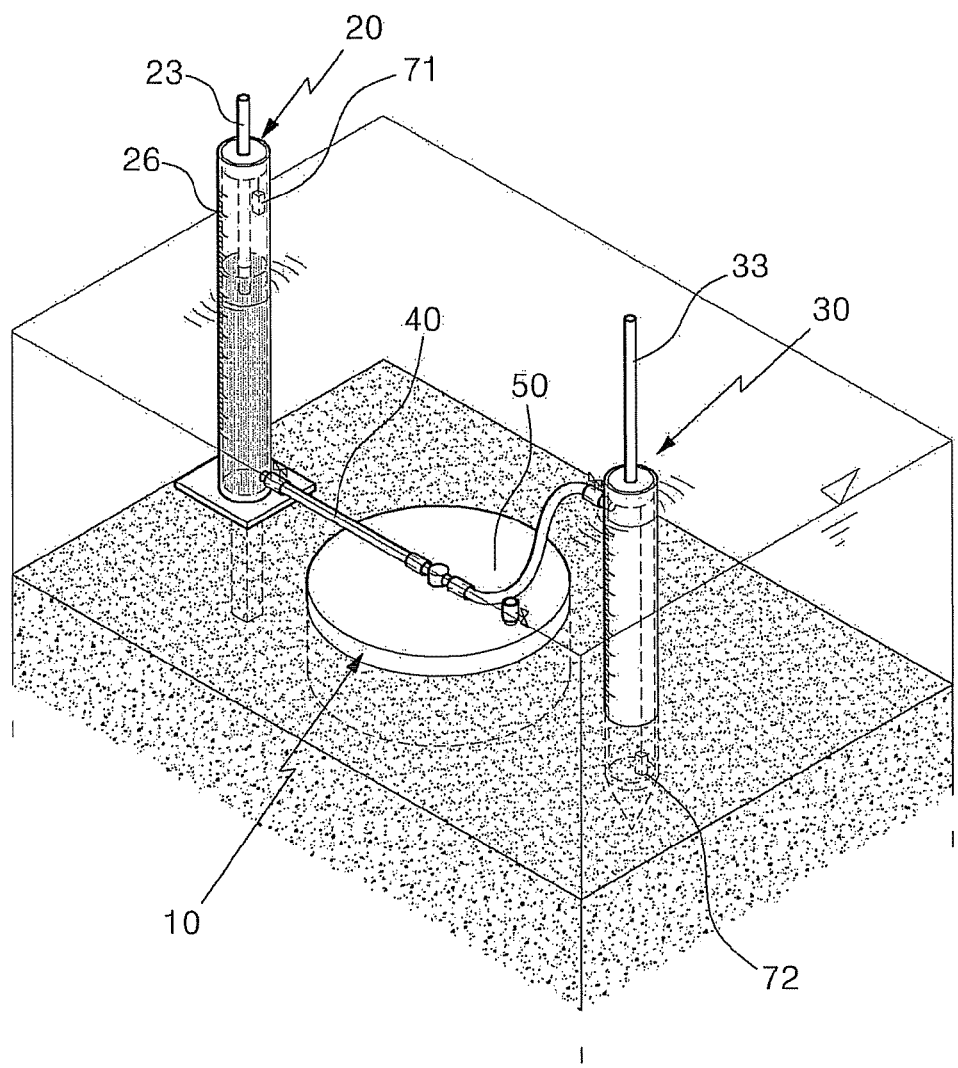
FIG. 6 is a perspective view illustrating a seepage meter capable of sequential measuring of discharge and recharge amounts of groundwater according to one exemplary embodiment of the present invention.
Figure 7:
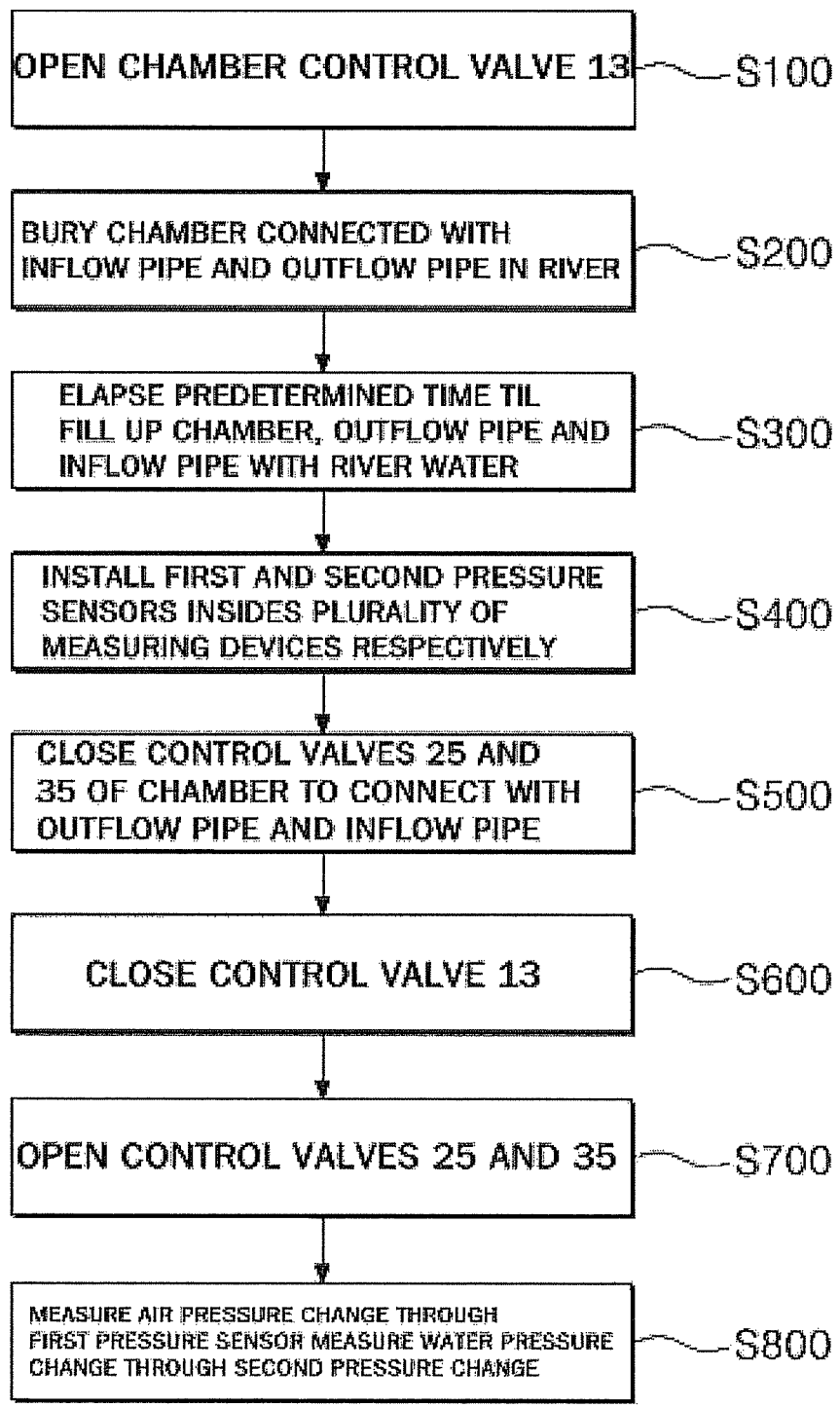
FIG. 7 is a flow chart illustrating a seepage meter capable of sequential measuring of discharge and recharge amounts of groundwater according to one exemplary embodiment of the present invention.

Hereinafter, the seepage meter capable of sequential measuring of groundwater discharge and recharge according to a preferable exemplary embodiment of the present invention will be described in detail with reference to FIG. 2 through FIG. 7.

As illustrated, the seepage meter capable of sequential measuring of groundwater discharge and recharge according to the present invention includes the chamber 10, the device for measuring groundwater recharge 20, the device for measuring groundwater discharge 30, the outflow pipe 40, the inflow pipe 50, and the first and second check valves 60 and 61.

The chamber 10 is a hollow cylindrical pipe which lower end is open to be used. Such chamber 10 is installed by inserting its open lower end with a predetermined depth in streambed sediment to be measured.

Further, an open pipe 11 is formed protruded at the top end of the chamber 10 to stabilize an inner and outer turbulent state of the chamber 10 that is produced when installing the chamber 10 in stream sediment. The control valve 13 is installed at the open pipe 11. The control valve 13 is open when the chamber is installed initially for water to flow in and out through the open pipe 11. After the inner and outer turbulent state of the chamber 10 is stabilized, the control valve 13 is turned off to stop flow in or out of water.

Further, the connection hole 12 protruded outwardly at a middle of the top end of the chamber 10 is communicated with respect to the outflow pipe 40 and the inflow pipe 50 that are to be described afterward.

The device for measuring groundwater recharge 20, as illustrated in FIG. 2A, is to measure amount of water recharged from surface water in case of losing stream where groundwater level is lower than surface water level. The device 20 for that purpose includes the water bath for measuring groundwater recharge 21 and the tube 23.

The water bath 21 is a cylindrical pipe of circular cross section which upper and lower ends are sealed. A stopper member 22 is coupled and fixed at the upper end to seal the upper end of the water bath 21. An inserting hole 22a is formed bored at the stopper member 22 to insert the tube 23, which upper and lower ends are open, in a lengthwise direction of the bath 21 and to flow air inside to the water bath 21.

Such water bath for measuring recharge 21 is installed upright to stream by pre-installing a support 27 to support and fix the water bath 21 for upright installation of the water bath 21 on an upper end of the support 27. An upper end portion of the water bath 21 is to protrude above water surface (a top surface of stream). A middle portion of the tube 23 is installed to be inserted to the stopper member 22 of the water bath 21. Then, the upper end of the tube 23 has a form protruded above the water bath 21 and the lower end of the tube is inserted inside the water bath in the lengthwise direction of the water bath 21.

Further, in case of losing stream where groundwater level is lower than surface water level, the water which has filled a predetermined height of the water bath 21 outflows to the chamber 10 and decreases the water level in the water bath 21 and an amount of water discharge from surface water to groundwater can be measured.

For such measurement, the water bath 21 uses various materials (glass, plastic, etc.) of transparent or translucent property with a measurement marking 26 on the outer circumferential surface of the water bath 21 as well. (This is identically applied to the water bath for measuring discharge 31 of cylindrical shape.)

Further, the water bath 21 is formed with the outflow hole 24. The outflow hole is bored to position at the horizontal line of the top surface of the chamber 10.

The device for measuring groundwater 30 is to measure amount of groundwater discharge when groundwater discharges to stream due to higher groundwater level than surface water level as illustrated in FIG. 2B. For this, the device 30 includes the water bath for measuring discharge 31 and the tube 33.

The water bath 31 is a hollow pipe of cylindrical cross section which upper and lower ends are sealed. The bath 31 lower end is buried into the bottom surface of stream at a predetermined depth to be installed fixed in upright state. To be installed fixed at the predetermined depth easily by an external force of a surveyor, a fix unit 32 of reversed triangle shape with diameter gradually decreased in a lengthwise direction of the water bath 31 may be formed at the lower end of the water bath 31. Further, the upper end of the water bath 31 is bored for the tube 33 to pass through and inflow air inside the water bath 31.

Since only an atmospheric pressure P0 is applied inside the water bath 31 and a sum of the water pressure P4 and the atmospheric pressure P0 is applied to the water chamber 10, the inflow hole 34 is positioned as high as the top surface of stream to eliminate and offset the pressure difference P4 between the chamber 10 and the water bath 31.

In case of gaining stream, water discharged from the chamber 10 is collected in the water bath 31 through the inflow pipe 50 and the inflow hole 34. Then, the water level of the water bath 31 is increased and by measuring the water level change h2 accordingly, a discharge amount of groundwater to surface water can be evaluated.

The outflow pipe 40 is open at its opposite ends. The one end is installed to be communicated with the outflow hole 24 and the other one end is installed to be communicated with the connection hole 12 of the chamber 10.

The inflow pipe 50 is open at its opposite ends. The one end is installed to be communicated with the inflow hole 34 and the other one end is installed to be communicated with the connection hole 12 of the chamber 10.

The first and the second check valves 60 and 61 are to control a direction of water movement. The first check valve 60 is installed in the outflow pipe 40 and the second check valve 61 is installed in the inflow pipe 50 respectively.

In order to measure only discharge amount of groundwater by the previously mentioned device for measuring groundwater discharge 30, the first check valve 60 controls water filled in the water bath 21 to move toward the chamber 10 but prevents water in the chamber 10 from flowing into the water bath 21 and the second check valve 61 controls water in the chamber 10 to move and fill the water bath 31

Further, in the present invention, one end of the outflow hole 24 and one end of the inflow hole 34 are installed with the valves 25 and 35 capable of on/off respectively. At a stage of preparing an operation of the seepage meter capable of sequential measuring of groundwater discharge and recharge, the each of the controls valves 25 and 35 is turned off to prevent prior discharge of water to the device for measuring groundwater discharge 30 or inflow of water from the device for measuring groundwater recharge 20. The outflow pipe 40 and the inflow pipe 50 are separated from the control valves 25 and 35. Then, the both ends of the outflow pipe 40 and the inflow pipe 50 are positioned under water to fill the insides of the outflow pipe 40 and the inflow pipe 50 with water. When start the measuring, the control valve 13 of the chamber 10 is turned off and after connecting the outflow pipe 40 and the inflow pipe 50 with the device for measuring groundwater recharge 20 and the device for measuring groundwater discharge 30 respectively, the control valves 25 and 35 are turned to on state for the measurement.

If the water does not fill the outflow pipe 40 and the inflow pipe 50 prior when start the measuring, an amount of groundwater recharge or discharge cannot be measured precisely, since the water bath for measuring recharge 21 outflows water to the chamber 10 or water flows into the bath for measuring discharge 31 only after filling the outflow pipe 40 and the inflow pipe 50 as much as their lengths.

According to the present invention, the water level drop h1 and the water level change h2 are measured through the measurement markings 26 of the device for measuring groundwater recharge 20 and the device for measuring groundwater discharge 30 to survey the amount of groundwater recharge and discharge individually. Further, the first pressure sensor 71 is installed above the water surface of the water bath 21 of the device 20, and the second pressure sensor 71 is installed on the bottom surface of the water bath 31 respectively. In case of the device 20, the groundwater recharge is measured through measuring an air pressure change inside the water bath 21 by the first pressure sensor 71. In case of the device 30, the groundwater discharge is surveyed through measuring a water level change inside the water bath 31 by the second pressure sensor 72.

Further, besides the above exemplary embodiments, the device 20 installed with the first sensor 71 and the device 30 installed with the second sensor 72 may be constructed by replaced with flow meters 30 respectively to measure amounts of groundwater discharge and recharge.

An order to install the preferable exemplary embodiment of the present invention having above configuration and structure is as follows.

1. Maintain the connected state of the chamber 10 with the outflow pipe 40 and the inflow pipe 50 and open the control valve 13 of the chamber 10. While leaving the chamber 10 in unconnected state with the device for measuring groundwater recharge 20 and the device for measuring groundwater discharge 30, install the chamber 10 buried into the bottom surface of stream (S100, S200).

2. Fill insides of the chamber 10, the outflow pipe 40 and the inflow pipe 30 with water by elapsing a predetermined time in a state of positioning the chamber 10, the outflow pipe 40 and the inflow pipe 50 inside the stream (S300).

3. Prepare the device for measuring groundwater recharge 20 by installing the first pressure sensor 71 and prepare the device for measuring groundwater discharge 30 by installing the second pressure sensor 72 (S400).

4. Fill the device for measuring groundwater recharge 20 with water up to a predetermined water level and close the control valve 25 installed at the outflow hole 24 so that the water does not outflow. Close the control valve 35 installed at the inflow hole 34 so that water does not inflow to the device for measuring groundwater discharge 30 when installing the device 30 in the stream. Then, install the device 20 and the device 30 in the stream and connect the outflow pipe 40 to the control valve 25 and the inflow pipe 50 to the control valve 35 (S500).

5. In order to start measuring, close the control valve 13 and open the control valves 25 and 35 of the device 20 and the device 30 respectively so that water flows according to a property of gaining stream or losing stream (S600, S700).

6. Measure the water level drop h1 and the water level change h2 directly and individually through the measurement marks 26 of the device 20 and the device 30. Otherwise, measure the amount of groundwater recharge by measuring the change in air pressure in the water bath for measuring recharge 21 through the first pressure sensor 71 and measure the amount of groundwater discharge by measuring the change in water pressure in the water bath for measuring discharge 31 through the second pressure sensor 72 (S800).

As described above, the present invention can measure amounts of groundwater discharge and recharge by inducing a change in inflow and outflow between surface water and groundwater to a change in water levels inside the water baths.

Further, the present invention can measure the amounts of groundwater discharge and recharge individually by separating a load between the device for measuring groundwater recharge and the device for measuring groundwater discharge.

While the present invention has been described with reference to the limited exemplary embodiments and drawings, the present invention is not restricted by the above description but various changes and modifications may be made by those of ordinary skill in the art without departing from the technical spirit of the present invention and an equivalent scope of the present invention as defined by the following claims.

What is claimed is:

1. A seepage meter capable of sequential measuring of groundwater discharge and recharge comprising:
    a chamber 10 installed in stream sediment and filled inside thereof with water;
    a device for measuring groundwater recharge 20 that is filled with water inside thereof and installed fixed on the bottom surface of stream to measure a water level drop h1 by flowing the water inside thereof to the chamber 10 in case of losing stream, wherein the device for measuring groundwater recharge 20 is connected and communicated with the chamber 10;
    a device for measuring groundwater discharge 30 that is installed fixed on the bottom surface of stream to measure a water level change h2 by inflowing water from the chamber 10 in case of gaining stream, wherein the device 30 is connected and communicated with the chamber 10;
    a first pressure sensor 71 installed above an inner water surface of the device for measuring groundwater recharge 20 to measure groundwater recharge through a change in air pressure by the water level drop h1; and
    a second pressure sensor 72 installed on a bottom surface of the device for measuring groundwater discharge 30 to measure groundwater discharge through a change in water pressure by the water level change h2.

2. The seepage meter according to claim 1,
    wherein the chamber 10 is open at lower end thereof and installed in the bottom surface of stream and the chamber 10 comprises:

a control valve 13 installed inside the chamber 10 and controlling water that flows into and out from the chamber 10;

an outflow pipe 40 to discharge water of the device for measuring groundwater recharge 20 to the chamber 10;

an inflow pipe 50 to flow water of the chamber 10 into the device for measuring groundwater discharge 30;

a first check valve 60 installed in the outflow pipe 40 for water to flow only to the chamber 10; and a second check valve 61 installed in the inflow pipe 50 for water of the chamber 10 to flow only to the device for measuring groundwater discharge 30.

3. The seepage meter according to claim 1, wherein the device for measuring groundwater recharge 20 is sealed at both ends thereof and filled with water, and the device for measuring groundwater recharge 20 comprises:

a water bath for measuring recharge 21 formed with an outflow hole 24, wherein the outflow hole 24 is formed on an outer circumferential surface of the water bath for measuring recharge 21 and positioned at a horizontal line identical with a top surface of the chamber 10;

a tube 23 installed inside the water bath for measuring recharge 21 and which lower end is positioned at a horizontal line identical with a top surface of stream, wherein the tube 23 inflows air to increase air pressure as much as water pressure decreased from decreased water level; and a control valve 25 positioned at the outflow hole 24 that controls water discharge.

4. The seepage meter according to claim 1, wherein the device for measuring groundwater discharge 30 is sealed at both ends thereof and the one end thereof is installed fixed in the bottom surface of stream, and the device for measuring groundwater discharge 30 comprises:

a water bath for measuring discharge 31 formed with an inflow hole 34, wherein the inflow hole 34 is formed on an outer circumferential surface of the water bath for measuring discharge 31 and positioned at a horizontal line identical with an upper surface of stream;

a tube 33 installed inside the water bath for measuring discharge 31, wherein the tube 23 outflows air to decrease air pressure as much as water pressure increased from decreased water level; and a control valve 35 positioned at the inflow hole 34 that controls water inflow.

5. The seepage meter according to claim 1, wherein the chamber 10, the discharge pipe 40, and the inflow pipe 50 are filled with water inside thereof before measuring groundwater recharge or discharge.

6. The seepage meter according to claim 1, wherein the device for measuring groundwater recharge 20 installed with the first sensor 71 and the device for measuring groundwater discharge 30 installed with the second sensor 72 are constructed by replaced with flow meters 30 respectively to measure amounts of groundwater discharge and recharge.

\* \* \* \* \*